(12) United States Patent
Doan et al.

(10) Patent No.: US 6,539,397 B1
(45) Date of Patent: Mar. 25, 2003

(54) OBJECT-ORIENTED PARADIGM FOR ACCESSING SYSTEM SERVICE REQUESTS BY MODELING SYSTEM SERVICE CALLS INTO AN OBJECT FRAMEWORK

(75) Inventors: Bach Dinh Doan, San Jose, CA (US); Shyh-Mei Fang Ho, Cupertino, CA (US); John Richard Shelton, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,930

(22) Filed: Mar. 31, 2000

(51) Int. Cl.⁷ .............................................. G06F 17/30
(52) U.S. Cl. ................................................. 707/103 R
(58) Field of Search ..................... 707/2, 10, 103 R, 707/104.1, 202; 379/201.01; 709/238; 714/15

(56) References Cited

U.S. PATENT DOCUMENTS

| | | | |
|---|---|---|---|
| 5,548,779 A | 8/1996 | Andert et al. ................ 709/203 |
| 5,594,899 A | 1/1997 | Knudsen et al. ................ 707/2 |
| 5,737,597 A | 4/1998 | Blackman et al. ........... 707/102 |
| 5,794,247 A | 8/1998 | Blackman et al. ........ 707/103 R |
| 5,794,248 A | 8/1998 | Blackman et al. ....... 707/103 R |
| 5,799,313 A | 8/1998 | Blackman et al. ....... 707/103 R |
| 6,014,673 A | * | 1/2000 | Davis et al. .................... 705/8 |
| 6,192,369 B1 | * | 2/2001 | Doan et al. ............. 351/160 H |
| 6,279,041 B1 | * | 8/2001 | Baber et al. ................. 370/235 |

OTHER PUBLICATIONS

Madjid, M. et al.., "Specification of the Database Behavior Through the Active Object Paradigm", Proceedings: Seventh International Workshop on Database and Expert Systems Applications, 1996, pp. 141–146 (1-page Abstract).

Davis, J. et al., "Integrated Modeling Implementation Using Object–Relational Database Systems", Proceedings of the Fourth Annual Workshop on Information Technologies and Systems, WITS 1994, pp. 185–194 (1-page Abstract).

* cited by examiner

*Primary Examiner*—Diane D. Mizrahi
*Assistant Examiner*—Apu M Mofiz
(74) *Attorney, Agent, or Firm*—Gates & Cooper LLP

(57) ABSTRACT

A method, apparatus, and article of manufacture for accessing a hierarchical database. The database is modeled into an objects framework, wherein the objects framework corresponds to one or more application views, database definitions, and data defined and stored in the database system, one or more message queues for communicating with the database system, and one or more system services of the database system Transactions from an application program are processed through the objects framework using the message queue objects. System services provided by the database system are invoked from an application program through the objects framework using the system services objects.

15 Claims, 5 Drawing Sheets

OBJECT-ORIENTED PARADIGM FOR ACCESSING SYSTEM SERVICE REQUESTS BY MODELING SYSTEM SERVICE CALLS INTO AN OBJECT FRAMEWORK

CROSS-REFERENCE TO RELATED APPLICATIONS

This application is related to the following co-pending and commonly assigned patent applications:

Utility application Ser. No. 09/540,336, entitled "AN OBJECT-ORIENTED PROGRAMMING MODEL FOR ACCESSING BOTH RELATIONAL AND HIERARCHICAL DATABASES FROM AN OBJECTS FRAMEWORK," filed on same date herewith, by RID. Hannon, Shyh-Mei Ho, and Vern L. Watts, Utility application Ser. No. 09/097,376, entitled "AN OBJECT-ORIENTED PARADIGM FOR ACCESSING TRANSACTIONAL REQUESTS BY MODELING I/O MESSAGE QUEUES INTO AN OBJECT FRAMEWORK, " filed on Jun. 15,1998, by Bach D. Doan, Shyh-Mei F. Ho, and Jenny Y. Liao, now U.S. Pat. No. 6,192,369, issued Feb. 20, 2001, Utility application Ser. No. 09/070,071, entitled "AN EXECUTION PARADIGM FOR ACCESSING HIERARCHICAL DATA USING AN OBJECT FRAME WORK," filed on Apr. 30, 1998, by Kenneth R. Blackman, Shyh-Mei F. Ho, and Thomas Beavers Sander, now U.S. Pat. No. 6,202,069, issued Mar. 13, 2001, Utility application Ser. No. 09/070,274, entitled "A GENERIC EXECUTION MODEL FOR ISOLATING APPLICATIONS FROM UNDERLYING DATABASES," filed on Apr. 30, 1998, by Kenneth R. Blackman, Shyh-Mei F. Ho, and Thomas Beavers Sander, now U.S. Pat. No. 6,360,229, issued Mar. 19, 2002, Utility application Ser. No. 09/070,528, entitled "AN OBJECT-ORIENTED PROGRAMMING MODEL FOR ACCESSING HIERARCHICAL DATABASES," filed on Apr. 30, 1998, by Bach Dinh Doan and Shyh-Mei F. Ho, Utility application Ser. No. 09/070,273, entitled "AN INTERNET-ENABLED GENERIC APPLICATION PROGRAM FOR ACCESSING HIERARCHICAL DATA," filed on Apr. 30, 1998, by Bach Dinh Doan and Shyh-Mei F. Ho, now U.S. Pat. No. 6,128,611, issued Oct. 3, 2000, Utility application Ser. No. 09/070,227, entitled "GENERATING AN INTERNET APPLICATION FOR ACCESSING A HIERARCHICAL DATABASE," filed on Apr. 30, 1998, by Attila J. Fogarasi Shyh-Mei F. Ho, Wai-Lee D. Ling, and Kevin M. McBride, now U.S. Pat. No. 6,128,619, issued Oct. 3, 2000, Utility application Ser. No. 09/042,238, entitled "A USER INTERFACE FOR CREATING PROGRAM SPECIFICATIONS FOR ACCESSING DATABASE PERSISTENT OBJECTS," filed on Mar. 13, 1998, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, now U.S. Pat. No. 6,128,622, issued Oct. 3, 2000, which claims the benefit under 35 U.S.C. §119(e) of Provisional Application Ser. No. 60/067,292, entitled "A USER INTERFACE FOR CREATING PROGRAM SPECIFICATIONS FOR ACCESSING DATABASE PERSISTENT OBJECTS," filed on Nov. 26, 1997, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson, Utility application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Theresa H. Lai, Allen G. Lee, and Richard S. Uyehara, now U.S. Pat. No. 5,781,739, issued Jul. 14, 1998, Utility application Ser. No. 09/074,928, entitled "A FRAMEWORK FOR OBJECT-ORIENTED ACCESS TO NON-OBJECT-ORIENTED DATABASES," filed on May 6, 1998, by Kenneth R. Blackman ad Jack L. Howe III, now U.S. Pat. No. 6,081,808, issued Jun. 27, 2000, which is a continuation of Utility application Ser. No. 08/736,762, entitled "A FRAMEWORK FOR OBJECT-ORIENTED ACCESS TO NON-OBJECT-ORIENTED DATABASES," filed on Oct. 25, 1996, by Kenneth R. Blackman and Jack L. Howe III, now U.S. Pat. No. 5,799,313, issued on Aug. 25, 1998, Utility application Ser. No. 09/047,786, entitled "A METHOD FOR CATALOGING DATABASE CHARACTERISTICS AND DEFINING AND GENERATING DATABASE PERSISTENT OBJECTS," filed on Mar. 25, 1998, by Kenneth R. Blackman and Jack L. Howe III, now U.S Pat. No. 6,223,184, issued Apr. 24, 2001, which is a continuation of Utility application Ser. No. 08/736,765, entitled "A METHOD FOR CATALOGING DATABASE CHARACTERISTICS AND DEFINING AND GENERATING DATABASE PERSISTENT OBJECTS," filed on Oct. 25, 1996, by Kenneth R. Blackman and Jack L. Howe III, now U.S. Pat. No. 5,737,597, issued on Apr. 7, 1998, all of which applications are incorporated by reference herein.

BACKGROUND OF THE INVENTION

1. Field of the Invention

The present invention relates generally to computerized methods for accessing databases, and in particular, to a computerized object-oriented method for performing system service requests by modeling system service calls into an object framework.

2. Description of Related Art

It is well known in the art to use database management systems, such as IBM's IMS™ (Information Management System) database management system, to manage computerized databases. Indeed, IMS™ has been used for decades and remains in use today. Currently, there is a need to access such "legacy" databases using application programs developed by object-oriented programming systems (OOPS). However, there are few tools available to assist OOPS developers.

One method for allowing object-oriented application programs to access data in an IMS™ database is through transaction wrappering, implemented in such products such as IBM's VisualAge IMS™ Connection. Transaction wrappering creates a class having methods that retrieve data from the IMS™ database, create an object embodying the retrieved data, and manipulate the object in an object-oriented application program. The problem with this approach is that each object-oriented application requires substantial additional coding, both object-oriented and non-object-oriented, before it is able to access the data in the IMS™ database.

Another approach to accessing data in a non-relational, non-object-oriented database is to translate the non-relational database to a relational database, and use existing object-oriented programming techniques developed for relational databases to access the data therein. The problem with this approach is that non-relational data, such as the hierarchical data found in an IMS™ database, does not map well to a relational database.

Thus, there is a need in the art for improved techniques for accessing hierarchical data using object-oriented frameworks.

SUMMARY OF THE INVENTION

To overcome the limitations in the prior art described above, and to overcome other limitations that will become apparent upon reading and understanding the present specification, the present invention discloses a method, apparatus, and article of manufacture for accessing a hierarchical database. The database is modeled into an objects framework wherein the objects framework corresponds to one or more application views, database definitions, and data defined and stored in the database system, one or more message queues for communicating with the database system, and one or more system services of the database system. Transactions from an application program are processed through the objects framework using the message queue objects. System services provided by the database system are invoked from an application program through the objects framework using the system services objects.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
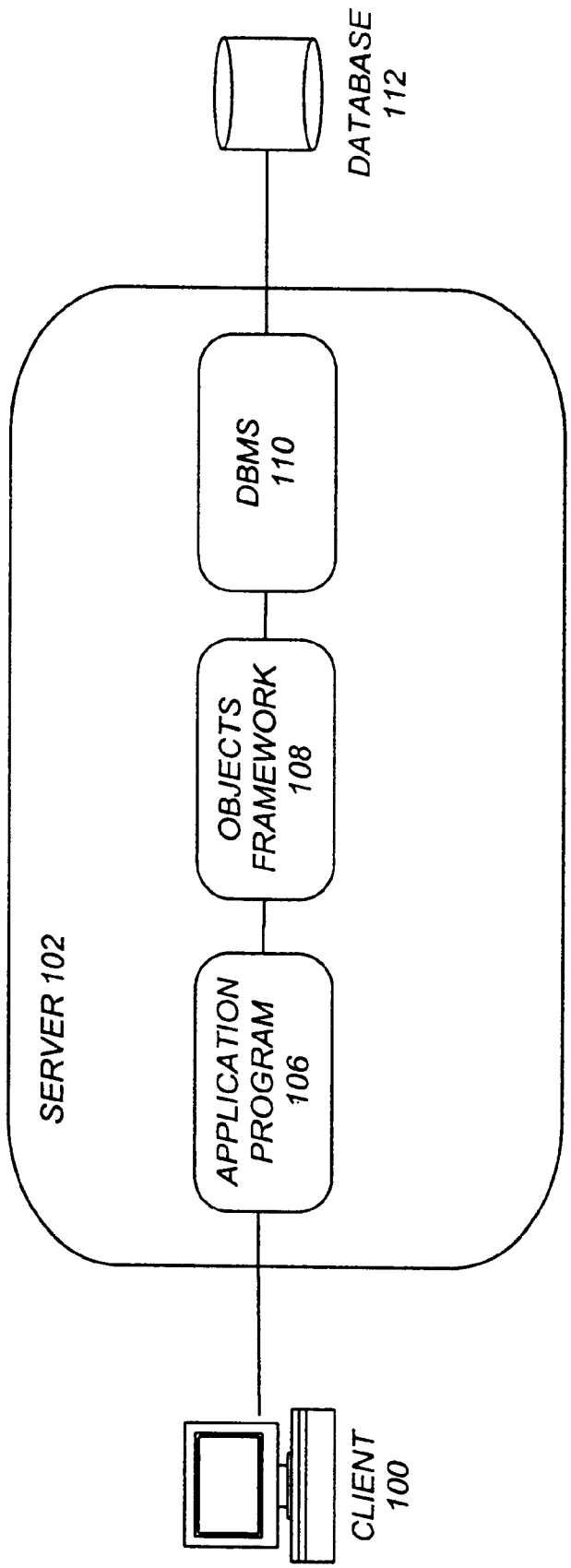
FIG. 1 is a block diagram illustrating an exemplary hardware environment used to implement the preferred embodiment of the present invention.

In the following description of the preferred embodiment, reference is made to the accompanying drawings, which form a part hereof, and in which is shown by way of illustration a specific embodiment in which the invention maybe practiced. It is to be understood that other embodiments may be utilized and structural changes may be made without departing from the scope of the present invention.

Overview

The present invention introduces a new execution paradigm for accessing hierarchical databases, such as an IMS™ database, by modeling the database into an objects framework and providing the mechanisms that allow object-oriented application programs to access the database data using standard tools, such as the DL/I™ query language for the IMS™ database. The objects framework instantiates IMS™ data objects upon demand from application programs and manages those objects from creation to deletion. Further, the objects framework uses these objects to dynamically construct DL/I™ calls from application program requests.

The objects framework can be used in a number of different environments, such as: (1) DL/I™ batch processing and (2) on-line transactions including both IMS™ and CICS™ transactions. Moreover, the objects framework can be executed in any MVS™ address space, including IMS™ and non-IMS™ address spaces, such as web server address spaces.

The objects framework also introduces a new paradigm to process IMS™ transactions from object-oriented IMS™ transactional application programs. Without the objects framework an IMS™ transactional application program would need to include programming for existing procedural interfaces to access IMS™ message queues using DL/I™ calls with program communication blocks (PCBs).

The objects framework provides object-oriented interfaces to the IMS™ Transaction Manager message queues to eliminate complicated message queue programming in the application program. The objects framework models IMS™ message queue processing as objects for both conversational and non-conversational message processing. This model not only eliminates DL/I™ coding with teleprocessing PCBs (i.e., I/O PCBs and alternate PCBS) to access IMS™ transactional message requests, it also constructs message request buffers and response buffers, including a scratch pad area (SPA).

The present invention also introduces a new paradigm to process IMS™ system service requests from object-oriented IMS™ application programs. The present invention models IMS™ system service requests as objects to ease IMS™ application development work and to eliminate DL/I™ coding with program communication blocks (PCBs), Application Interface Blocks (AIBs), and passing and receiving data in input/output areas to issue IMS™ system service requests and to allow easy access to the data returned by the IMS™ system service requests. Without the present invention, IMS™ applications would need to create its own interfaces to access IMS™ system services by using DL/I™ calls with PCBs, AIBs, and passing and receiving data in input/output areas.

Thus, the present invention offers improved IMS™ application programming productivity through the use of object-oriented programming techniques.

Hardware Environment

FIG. 1 is a block diagram illustrating an exemplary hardware environment used to implement the preferred embodiment of the invention. A client computer 100 communicates with a server computer 102. Both the client computer 100 and the server computer 102 are typically comprised of one or more processors, random access memory (RAM), read-only memory (ROM), and other components, such data storage devices and data communications devices.

The client computer 100 executes one or more computer programs 104 operating under the control of an operating system. These computer programs 104 transmit requests to the server computer 102 for performing various functions and receive data from the server computer 102 in response to the requests.

The server computer 102 also operates under the control of an operating system, and executes one or more computer programs 106, 108, and 110. These computer programs 106, 108, and 110 receive requests from the client computer 100 for performing various functions and transmit data to the client computers 100 in response to the requests.

The server computer 102 manages one or more databases 112 stored on one or more data storage devices (such as a fixed or hard disk drive, a floppy disk drive, a CD-ROM drive, a tape drive, or other device). In a preferred embodiment, the database 112 is managed by the IMS™ database management system (DBM) offered by IBM Corporation. Those skilled in the art will recognize, however, that the present invention may be applied to any database and associated database management system.

The present invention is generally implemented using five major components executed by client computers 100 and server computers 102, including a client program 104, object-oriented application program 106, objects framework 108, database management system (DBMS) 110 and database 112, wherein each of these components comprise instructions and/or data. The client program 104 provides a user interface, the object-oriented application program 106 performs application functions, the objects framework 108 materializes data retrieved from the database 112 as objects, and the database management system 110 controls access to the database 112.

Generally, these instructions and/or data 104–112 are all tangibly embodied in or retrievable from a computer-readable device, medium, carrier, or signal, e.g., a data storage device, a remote device accessible via a data communications device, etc. Moreover, these instructions and/or data, when read, executed, and/or interpreted by the client computer 100 and/or server computer 102, causes the client computer 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Objects Framework Model

Figure 2:
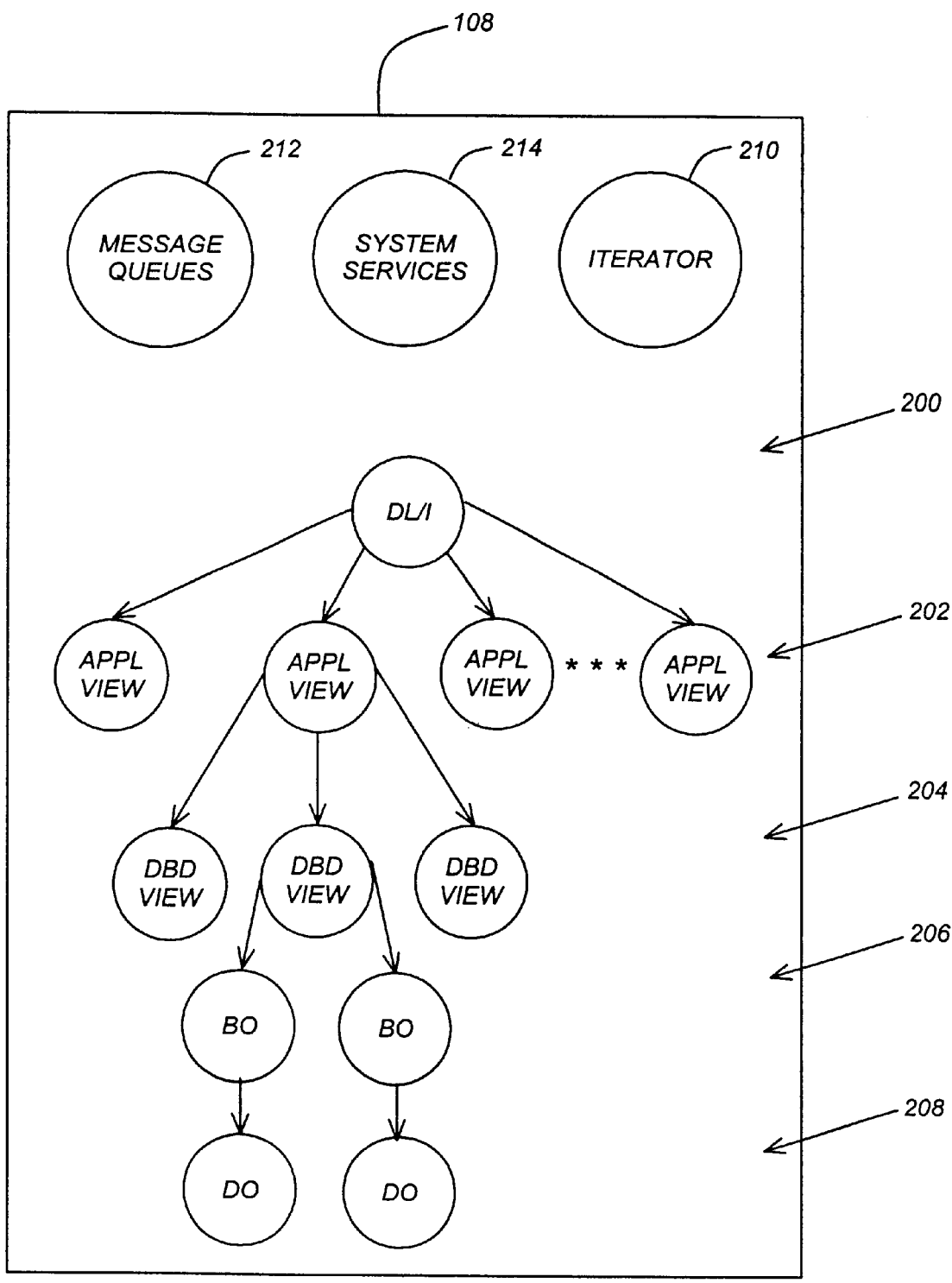
FIG. 2 is a block diagram illustrating a layered processing model used in the objects framework according to the present invention.

FIG. 2 is a block diagram illustrating a layered processing model provided by the objects framework 108 according to the present invention. The layered processing model corresponds to the application views, database definitions, and data defined and stored in an IMS™ database management system, as well as IMS™ Transaction Manager™ message queues and IMS™ System Services.

The objects framework 108 comprises a C++ class library that interfaces to the application program 106. The application program 106 dynamically loads previously defined objects into the objects framework 108 to access the database 112 during execution time. The objects loaded into the objects framework 108 include a DL/I™ object 200, one or more applView objects 202, one or more dbdView objects 204, one or more business objects (BOs) 206, one or more data objects (DOs) 208, an iterator object 210, one or more message queue objects 212, and one or more system services objects 214.

The application program 106 first loads the objects framework 108 class library. The objects framework 108 receives IMS™ transaction requests from a requestor via one or more instantiated message queue objects 212. The objects framework 108 then dynamically instantiates a DL/I™ object 200, one applView object 202, and one dbdView object 204. The objects framework 108 also dynamically loads the class library for the BOs 206 and DOs 208 requested by the application program 106 to create an iterator object 210. The iterator object 210 instantiates the BOs 206 and their corresponding DOs 208 during execution. After execution, responses are returned to the requestor as IMS™ transaction responses via the instantiated message queue objects 212. At anytime, IMS™ system services can be invoked via the instantiation of system services objects 214.

All the class objects, except the iterator class 210, the message queue class 212, and the system services class 214, are organized into a tree structure to represent the hierarchical structure of data retrieved from the database 112. In the preferred embodiment, the tree structure ensures that there is exactly one path through the hierarchy to each object and consequently exactly one identity, i.e., segment occurrence, for an object.

Each of the objects in the tree structure encapsulates a logical unit of data retrieved from the database 112 and includes member functions for manipulating the encapsulated data. The structure and member functions of these various objects are described in more detail below.

DL/I Object

In the preferred embodiment, the database 112 is an IMS™ database 112, which is an "application views database". The DL/I™ object 200 is the root of the objects framework 108, and thus is a root for a collection of application views (applView objects 202) in the IMS™ database 112. Thus, the objects framework 108 provides for multiple application views of the database 112 in a layered processing model.

applView Object

Each applView object 202 represents an "application (appl) view" of the IMS™ database 112. Each applView object 202 contains and manages a collection of dbdView objects 204.

dbdView Object

Each dbdView object 204 represents a "database description (dbd) view" associated with a given "application view" of the IMS™ database 112. Each dbdView object 204 includes information about the structure of the segments in the IMS™ database 112 and the record layouts, including formatting information for the records in the database 112. The dbdView objects 204 also define the hierarchy to help locate segments for the database 112. In the objects framework 108, each dbdView object 204 contains and manages a collection of data objects (DOs) 206 and business objects (BOs) 208.

Business Objects and Data Objects

The IMS™ database 112 is comprised of a collection of segment types, and each segment type contains a collection of segment occurrences. A DO 208 class represents each segment type and each segment occurrence is represented by an instance of the class, i.e., a DO 208. Thus, the DOs 208 provide a direct mapping of the data within each segment occurrence. Moreover, the object-oriented application program 106 can directly access the data of the segment occurrence by interacting with the DO 208 via the objects framework 108 to perform the necessary operations on the database 112.

In addition, a BO 206 may be instantiated with a DO 208 to provide business logic for the application program 106. In such an embodiment, the application program 106 accesses the business logic via the BO 206, which in turns invokes the member functions or methods of its corresponding DO 208 to perform the necessary operations on the database 112, to manage its essential state data. Thus, the DO 208 isolates the BO 206 from the specifics of the database 112. With the BO/DO model, customers can easily separate business logic from the physical data access logic to accommodate more diversified business needs. Furthermore, because of the nature of the separation of BO 206 and DO 208, the objects framework 108 can be easily extended to other non-hierarchical datastores, e.g., a relational database management system (RDBME).

Iterator Object

In the objects framework 108, the application program 106 uses a DL/I™ query string to access the IMS™ database 112. The application program 106 first instantiates a desired applView object 202. If the associated DL/I™ object 200 has not been instantiated yet, this also results in its instantiation as the root of the objects framework 108 and the root for the collection of applView objects 202 in the IMS™ database 112. The application program 106 then provides the DL/I™ query string to an "evaluate" function of the applView object 202, and the applView object 202 builds a DL/I™ segment search argument list based on the values within the DL/I™ query string.

The application program 106 then creates the iterator object 210 that is used to point to an incrementally-materialized collection of BOs 206 and DOs 208 that meet the search criteria specified in the DL/I™ query string. The "evaluate" function of the applView object 202 reads the DL/I™ query string and sets a pointer in the iterator object 210 to point to the collection of BOs 206 and DOs 208 that meet the DL/I™ segment search criteria.

A "next" function of the iterator object 210 is invoked to instantiate each BO 206 and/or DO 208 from the database 112, wherein the resulting state data of the BO 206 and DO 208 are cached in the memory of the server computer 102. Using the pointer and "next" function of the iterator object 202, the application program 106 can iterate through a collection of BOs 206 and/or DOs 208 to materialize one BO 206 and/or DO 208 after the other in the memory of the server computer 102.

Each BO 206 and DO 208 class contains both "get" and "set" functions associated for each class attribute. The application program 106 can then retrieve or update the attributes of a DO 208 by invoking these functions. Preferably, no I/O operations are performed at the invocation of these "get" and "set" functions, and all state data is changed in memory only until a commit occurs.

As described above, the BOs 206 are used by the application program 106 to perform needed business logic on the associated DOs 208. In addition, the application reprogram 106 can perform DL/I™ operations (e.g., retrieve, update, delete and insert) using member functions or methods of the BOs 206. The BO 206 will, in turn, invoke the member functions or methods of its corresponding DO 208 to perform actual DL/I™ calls.

The following functions exemplify the BO 206 methods that allow the application program 106 to retrieve a DO 208 from the database 112, to update state data for the DO 208 in the database 112, to add a new instance of the DO 208 to the database 112, or to delete a DO 208 from the database 112:

RetrieveFromDS ( )
UpdateToDS)( )
InsertToDS( )
DeleteFromDS( )

In a preferred embodiment, only the above four methods will result in actual I/O operations on the database 112.

Message Queue Object

The message queue class 212 models IMS™ Transaction Manager™ input and output message queues as objects. The message queue class includes, among others, "retrieveMsg" and "writeMsg" member functions or methods that allow transactional application programs 106 to retrieve messages from an IMS™ message queue, and then write responses to an originator via the same IMS™ message queue, and/or to another destination via other IMS™ message queues. Both request and response buffers are constructed dynamically by the message queue objects.

The message queue objects 212 support both conversational and non-conversational application programs 106 to allow the application programs 106 to selectively access scratch pad area (SPA) data in conversational mode. The message queue objects 212 also allows an output message to be displayed on a formatted screen by optionally supporting the message output descriptor (MOD) on the writeMsg method.

The object message objects 212 are also capable of supporting multiple message segments. Request buffers are allocated and created dynamically upon demand by application programs. Moreover, default sizes are provided for both SPA data and input message data. Therefore, if a buffer size is not specified by the application, the maximum default size will be used.

The same message request object can also be used to write SPA data and output message data back to the originator. However, output responses can also be written to a different destination by creating a separate message queue object with the specified destination.

System Services Object

The system services class 214 models IMS™ system services as objects. These system services objects 214 simplify the task of issuing system service requests to IMS™ and retrieving system information from IMS™. In the preferred embodiment, the system service class 214 includes, inter alia, the following member functions or methods:

basicCHKP
   Performs an IMS™ basic Checkpoint call to commit database 112 changes and establish a restart point.

symbolicCHKP
   Same as basicCHKP above, but also saves up to seven program areas.

INIT
   Performs an IMS™ INIT call to check deadlock occurrences and data availability.

environ
   Performs an IMS™ INQY call, and retrieves and returns all system information.

imsID
   Retrieves and returns an IMS™ system ID.

missReleaseLevel
   Retrieves and returns an IMS™ release level.

imsControlRegionType
   Retrieves and returns an IMS™ control region type.

regionID
   Retrieves and returns a region identifier.

applProgName
   Retrieves and returns the name of the application program 106.

psbName
   Retrieves and returns the name of the PSB (program status block) currently allocated.

transNme
   Retrieves and returns the transaction name.

userID
   Retrieves and returns the userid.

groupName
   Retrieves and returns the group name.

statusGroupIndicator
   Retrieves and returns the Status Group Indicator.

find
   Executes an IMS™ INQY call with a FIND subfunction to verify the existence of a PCB.

program
   Retrieves and returns the PSB name of the application program 106.

GMSG
   Retrieves and returns a message from an Automated Operator (AO) exit routine, DFSAOE00, for system messages destined for the master terminal, etc.

ICMD
   Issues an IMS™ command, and retrieves and returns the first command response.

RCMD
   Retrieves and returns subsequent command responses after an ICMD call.

LOG
   Writes information to the IMS™ system log.

ROLL
   Abnormally terminates the application program 106 and backs out any changes to the database 112.

ROLB
   Rolls back changes to the database 112.

ROLS
   Backs out to a processing point set by a prior SETS or SETU call.

SETS
   Sets an intermediate back-out point or cancels all existing back-out points.

SETU
   Sets an intermediate back-out point if unsupported PCBs exist or an external subsystem is used.

SNAP
   Collects diagnostic information.

STAT
   Obtains database 112 statistics for performance monitoring.

SYNC
   Releases resources that IMS™ has locked for the application program 106.

TERM
   Terminates a PSB in a CICS™ application program 106.

XRST
   Used to restart the application program 106.

Example Application Program

Following is a first example object-oriented application program 106 according to the present invention:

```
// application program
main( )
{
   long rc; // return code
   // instantiate a message queue object
   msgQueue mq (conversational_mode, input_length,
      spa_length)
   // if conversational mode, then create a SPA request
      buffer and
   // retrieve data from the SPA
   If conversational_mode=1
   {
      rc=mq.retrieveMsg(SpaBuffer);
   }
   // create message buffer and retrieve data from input
      message queue
   rc=mq.retrieveMsg(MessageBuffer);
   // parse the input for an application view, query string,
   //and/or desired operation
   process_input(MessageBuffer);
   // instantiate desired applView object (and DL/I object
      if necessary)
   applView_SSM applView(applViewName);
   // Dynamically build the DL/I query string based on the
      input
   build_query_string(MessageBuffer);
   // instantiate iterator object and pointer using applView
      object's
   // "evaluate" function and query string
   iterator* ltr=applView.evaluate(query string);
   // use "next" function to instantiate a BO and its
      corresponding DO
   BO*pObj=ltr->next( );
   // use indicated functions to retrieve, update, delete, or
   // insert BOs and DOs
   switch(operation)
   {
      // Retrieve DO
      case 0: pObj->RetrieveFromDS( );
         break;
      // Update DO
      case 1: pObj->UpdateToDS( );
         break;
      // Delete DO
      case 2: pObj->DeleteFromDS( );
         break;
```

```
        // Insert DO
    case 3: DO*pObj=ltr->newObject( );
        pObj->InsertToDS( );
        break;
    }
    // Dynamically build the response
    build_response(MessageBuffer);
    // if conversational mode, then write SPA request buffer
    If conversational_mode=1
    {
        rc=mq.senMsg(SpaBuffer);
    }
    // send output data to the original message queue
    rc=mq.sendMsg(MessageBuffer, output_length);
    // instantiate alternative message queue object
    msgQueue alternative_mq (conversational_mode,
        input_length,
        spa_length)
    // send output data to the alternative message queue
    rc=alternative_mq.sendMsg(MessageBuffer, output_
        length);
    }
```

Following is an example DL/I™ query string that could be used by the object-oriented application program 106 to retrieve DOs 208 from the database 112:

SELECT doClassNameC

FROM databaseViewName

WHERE doClassNameA.keyname relop keyvalue,
     doClassNameB.keyname relop keyvalue,
     doClassNameC.keyname relop keyvalue where "relop" is a relational operator, such as:
     EQ or=or=
     GT or>or>
     LT or<or<
     GE or>=or=>
     LE or<=or=<
     NE or!=or=!
     AND or & or*
     OR or|or+

Example Application Program

Following is a second example object-oriented application program 106 according to the present invention:

```
    public class appl
    {
        public static void main(String argv)
        {
            //Instantiate a system service object
            SystemService ss=new SystemService( );
            //Get the PSB name
            String psb=ss.psbName( ):
            //Get the IMS control region ID
            int region=ss.regionID( ):
            //Write a message to the IMS log
            ss.LOG("Sample program starting", logcode, sc):
            //Get a reference to a database PCB
            DBpcb a PCB=ss.find("DBPCB1", false, sc);
            //Issue checkpoint and get next message
            byte.msg=ss.basicCHKPT(len, "CHKID1", rc);
        }
    }
```

The pseudo-code above issues system service requests without having to have to build AIBs, PCBs, or formatted I/O areas, as these are all created dynamically upon demand. Of course, any of the various member functions or methods of the systems service object 214 could be invoked by an application program 106.

Logic of the Application Program

Figure 3:
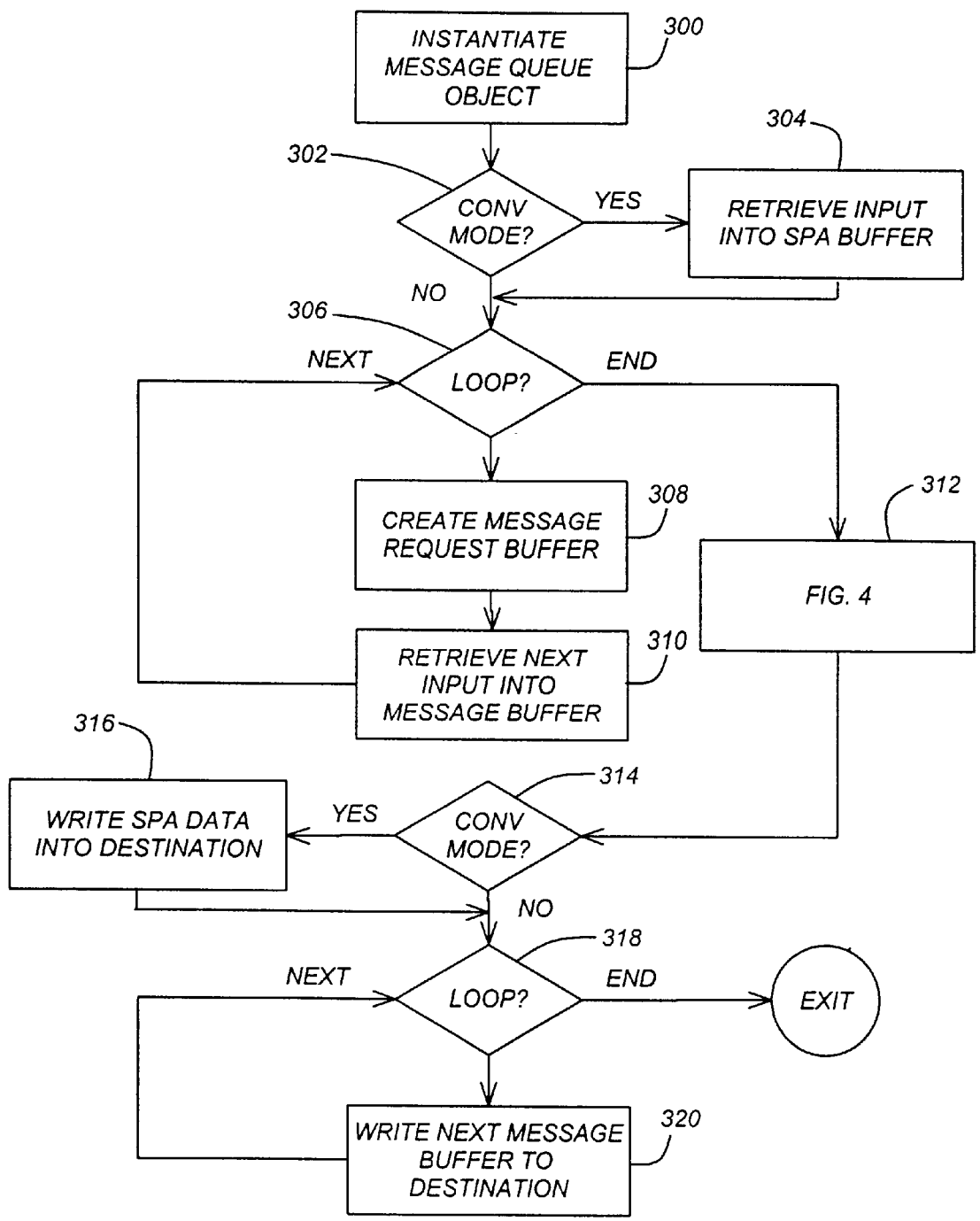
FIGS. 3, 4 and 5 together are a flowchart illustrating the steps performed by the application program and objects framework according to the present invention.
Figure 4:
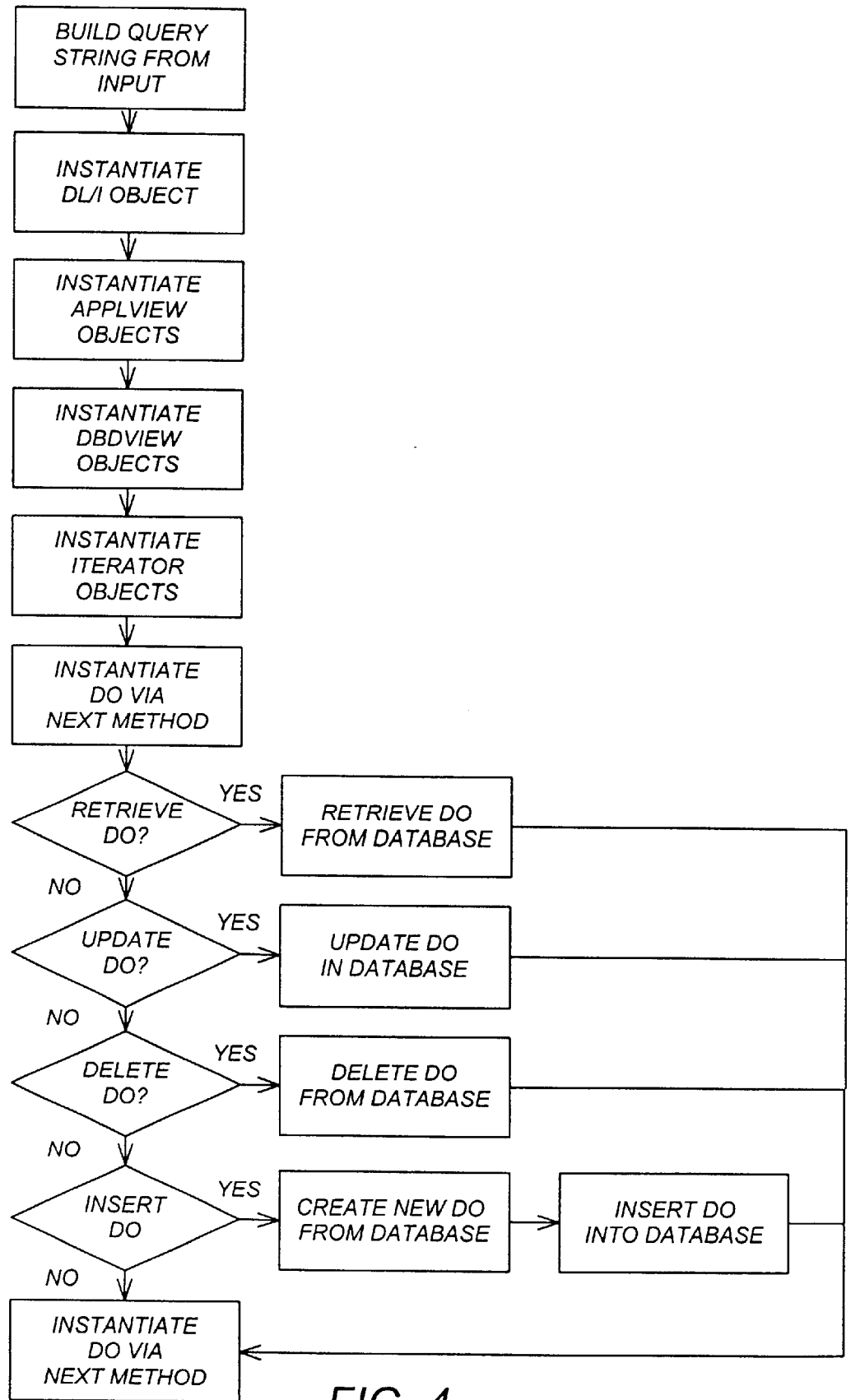
Figure 5:
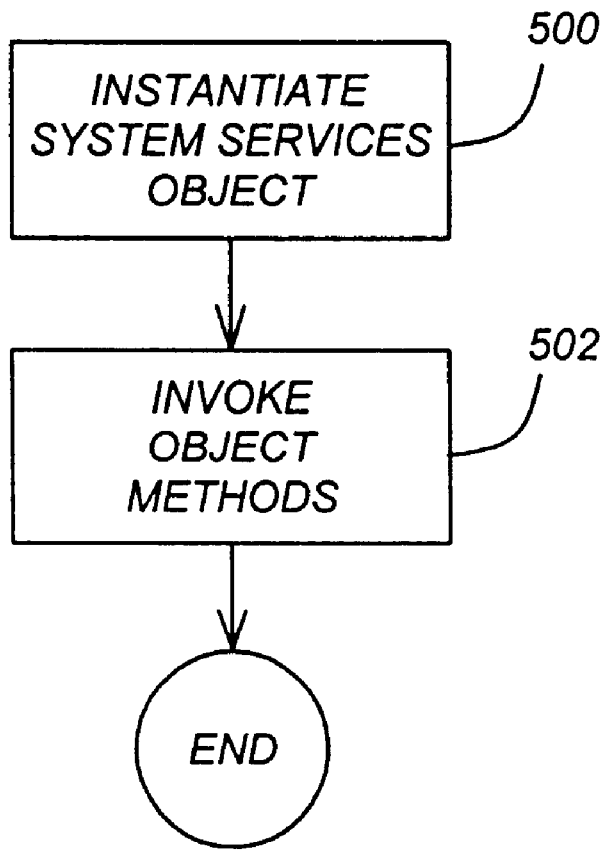

FIGS. 3, 4 and 5 together are a flowchart illustrating the steps performed by the application program 106 and objects framework 108 according to the present invention.

Referring to FIG. 3, Block 300 represents the application program 106 instantiating a message queue object 212 for the originator (e.g., terminal or program) in the memory of the server computer 102.

Block 302 is a decision block that represents the application program 106 determining whether the application is in conversational mode. If so, control transfers to Block 304; otherwise, control transfers to Block 306.

Block 304 represents the application program 106 creating a SPA buffer in the memory of the server computer 102 and retrieving input from the originator into the SPA buffer via the message queue object 212.

Blocks 306–310 are a loop for reading multiple message segments of an input message from the message queue object 212, wherein request buffers are allocated and created dynamically by the application program 106 in the memory of the server computer 102. Block 308 represents the application program 106 dynamically creating one or more message request buffers using the message queue object 212 and Block 310 represents the application program 106 retrieving one or more message segments from the message queue object 212 into the message request buffer.

After reading all the message segments, control transfers to Block 312, which represents the application program 106 processing the input message. This processing is further described in conjunction with FIG. 4. After the processing is completed, control transfers to Block 314.

Block 314 is a decision block that represents the application program 106 determining whether it is operating in conversational mode. If so, control transfers to Block 316; otherwise, control transfers to Block 318.

Block 316 represents the application program 106 writing the SPA buffer to a destination via the message queue object 212.

Blocks 318–320 represent a loop for writing multiple message segments to the destination via its message queue object 212. The destination could be the same as the originator (and thus use the same message queue object 212) and/or it be could different from the originator (and thus use a different message queue object 212). Block 320 represents the application program 106 writing one or more message segments to the destination's message queue object 212.

Finally, Block 322 represents the end of the logic.

Referring to FIG. 4, Block 400 represents the application program 106 parsing the input message, and dynamically constructing a DL/I™ query string based on the user input.

Block 402 represents the DL/I™ object 200 of the objects framework 108 being instantiated in the memory of the server computer 102. Usually, this occurs either when the objects framework 108 is loaded or when the application program 106 first requests an applView object 202.

Block 404 represents the application program 106 instantiating the requested applView object 202 in the memory of the server computer 102.

Block 406 represents the dbdView objects 204 of the objects framework 108 being instantiated in the memory of the server computer 102. Usually, this occurs either when the objects framework 108 is loaded or when the application program 106 first requests an applView object 202.

Block 408 represents the application program 106 instantiating the iterator object 210 in the memory of the server computer 102 and then setting its object pointer by invoking the "evaluate" member function or method with a DL/I™ query string.

Block 410 represents the application program 106 setting the pointer of the iterator object 210 in the memory of the server computer 102.

Block 412 represents the application program 106 invoking the "next" member function or method of the iterator object 210 to instantiate/materialize a DO 208 and/or BO 206 in the memory of the server computer 102.

Block 414 is a decision block that represents the application program 106 determining whether the requested operation is a request to retrieve a DO 208. If so, control transfers to Block 416; otherwise, control transfers to Block 418. Block 416 represents the application program 106 retrieving data from the database 112 via a member function or method of the DO 208. Thereafter, control transfers to Block 432.

Block 418 is a decision block that represents the application program 106 determining whether the requested operation is a request to update a DO 208. If so, control transfers to Block 420; otherwise, control transfers to Block 422. Block 420 represents the application program 106 updating data in the database 112 via a member function or method of the DO 208. Thereafter, control transfers to Block 432.

Block 422 is a decision block that represents the application program 106 determining whether the requested operation is a request to delete a DO 208. If so, control transfers to Block 424; otherwise, control transfers to Block 426. Block 424 represents the application program 106 deleting data from the database 112 via a member function or method of the DO 208. Thereafter, control transfers to Block 432.

Block 426 is a decision block that represents the application program 106 determining whether the requested operation is a request to insert a DO 208. If so, control transfers to Block 428; otherwise, control transfers to Block 432. Block 428 represents the application program 106 creating or instantiating a new DO 208 and Block 430 represents the application program 108 inserting data into the database 112 via a member function or method of the DO 208. Thereafter, control transfers to Block 432.

Block 432 represents the application program 108 building a response to the input message from the results of the prior operations.

Referring to FIG. 5, Block 500 represents the systems services object 214 being instantiated in the memory of the server computer 102. Usually, this occurs either when the objects framework 108 is loaded or when the application program 106 makes a system services call. This logic may be performed independently of the logic in FIGS. 3 and 4.

Block 502 represents one or more of the member functions or methods of the systems services object 214 being invoked. Specifically, these member functions or methods comprise the member functions or methods described above in conjunction with the system services class 214.

Thereafter, the logic terminates.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. Instead, the present invention could be used to model other types of databases and datastores.

In summary, the present invention discloses a method, apparatus, and article of manufacture for accessing a hierarchical database. The database is modeled into an objects framework, wherein the objects framework corresponds to application views, data structures, and data defined and stored in the database. The database is then accessed through the objects framework The objects framework includes, inter alia, a DL/I™ object, one or more applView objects, one or more dbdView objects, one or more business objects (BOs), and one or more data objects (DOs), all of which are arranged in a hierarchy. The objects framework also includes an iterator object, one or more message queue objects, and one or more system services objects.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for accessing a database, comprising:

(a) modeling a database system into an objects framework, wherein the objects framework includes one or more data objects that represent data stored in the database, one or mote business objects that represent logic for operating on the data objects, one or more database definition view objects that represent a structure and layout for the database and manage a collection of the data objects and business objects, one or more application view objects that represent an application view of the database and manage a collection of the database definition view objects, an object as a root for a collection of the application view objects and a root of the objects framework, one or more message queue objects for communicating with the database system, and one or more system services objects for interacting with system services of the database system;

(b) processing transactions from an application program through the objects framework using the message queue objects; and (c) issuing system service requests to the database system from an application program and retrieving system information from the database system to the application program through the objects framework using the system services objects.

2. The method of claim 1, wherein the modeling step (a) further comprises modeling system services requests in the database system using the system services objects.

3. The method of claim 1, wherein the system services objects include one or more functions that allow the application program to invoke one or more system services of the database system.

4. The method of claim 1, wherein the system services objects include one or more functions that allow the application program to retrieve system information from the database system.

5. The method of claim 1, wherein the system services objects include one or more functions selected from a group comprising:
 a function for performing checkpoints to commit database changes and establish a restart point,
 a function for performing checkpoints to commit database changes, establish a restart pain; and save program areas,
 a function for checking deadlock occurrences and dam availability,
 a function for retrieving system information,
 a function for retrieving a system ID,
 a function for retrieving a release level indicator,
 a function for retrieving a control region type,
 a function for retrieving a region identifier,
 a function for retrieving a name of an application program,
 a function for retrieving a name of a program status block,
 a function for retrieving a transaction name,
 a function for retrieving a userid,
 a function for retrieving a group name,
 a function for retrieving a Status Group Indicator,
 a function for verifying an existence of a program control block,
 a function for retrieving a program status block name for an application program,
 a function for retrieving a message,
 a function for issuing a command and retrieving a command response,
 a function for retrieving subsequent command responses,
 a function for writing information to a system log,
 a function for abnormally terminating an application program and backing out any changes to a database,
 a function for rolling back changes to a database,
 a function for backing out to a previously-set processing point,
 a function for setting in intermediate back-out point or canceling all existing back-out points,
 a function for setting an intermediate back-out point if unsupported program control blocks exist or an external subsystem is used,
 a function for collecting diagnostic information,
 a function for obtaining database statistics for performance monitoring,
 a function for releasing resources that have been locked for an application program,
 a function for terminating a program status block in an application program, and
 a function for restarting an application program.

6. A computerized apparatus for accessing a database, comprising:
 (a) means for modeling a database system into an objects framework, wherein the objects framework includes one or mote data objects that represent data stored in the database, one or more business objects that represent logic for operating on the data objects, one or more database definition view objects that represent a structure and layout for the database and manage a collection of the data objects and business objects, one or more application view objects that represent an application view of the database and manage a collection of the database definition view objects, an object as a root for a collection of the application view objects ad a root of the objects framework, one or more message queue objects for communicating wit the database system, and one or more system services objects for interacting with system services of the database system;
 (b) means for processing transactions from an application program through the objects framework using the message queue objects; and
 (c) means for issuing system service requests to the database system from an application program and retrieving system information from the database system to the application program through the objects framework using the system services objects.

7. The apparatus of claim 6, wherein the means for modeling (a) further comprises means for modeling system services requests in the database system using the system services objects.

8. The apparatus of claim 6, wherein the system services objects include one or more functions that allow tie application program to invoke one or mote system services of the database system.

9. The apparatus of claim 6, wherein the system services objects include one or more functions that allow the application program to retrieve system information from the database system.

10. The apparatus of claim 6, wherein the system services objects include one or more functions selected from a group comprising:
 a function for performing checkpoints to commit database changes and establish a restart point,
 a function for performing checkpoints to commit database changes, establish a restart point, and save program areas,
 a function for checking deadlock occurrences and data availability,
 a function for retrieving system information,
 a function for retrieving a system ID,
 a function for retrieving a release level indicator,
 a function for retrieving a control region type,
 a function for retrieving a region identifier,
 a function for retrieving a me of an application program,
 a function for retrieving a name of a program status bloc,
 a function for retrieving a transaction name,
 a function for retrieving a userid,
 a function for retrieving a group name,
 a function for retrieving a Status Group Indicator,
 a function for verifying an existence of a program control block,
 a function for retrieving a program status block name for an application program,
 a function for retrieving a message,
 a function for issuing a command and retrieving a command response,
 a function for retrieving subsequent command responses, a function for writing information to a system log, a function for abnormally terminating an application program and backing out any changes to a database, a function for rolling back changes to a database, a function for backing out a previously-set processing point, a function for setting an intermediate back-out point or canceling all existing back-out points, a function for setting an intermediate back-out point if unsupported program control blocks exist or an external subsystem is used, a function for collecting diagnostic information, a function for obtaining database statistics for performance monitoring, a function for releasing resources that have been locked for an application program, a function for terminating a program status block in an application program, and a function for restarting an application program.

11. A program storage medium readable by a computer, the medium embodying one or more instructions executable by the computer to perform method steps for accessing a database, the method comprising the steps of:

(a) modeling a database system into an objects framework, wherein the objects framework includes one or more data objects that represent data stored in the database, one or more business objects that represent logic for operating on the data objects, one or more database definition view objects that represent a structure and layout for the database and manage a collection of the data objects and business objects, one or more application view objects that represent an application view of the database and manage a collection of the database definition view objects, an object as a root for a collection of the application view objects and A toot of the objects framework, one or more message queue objects for communicating with the database system, and one or more system services objects for interacting with system services of the database system;

(b) processing transactions from an application program through the objects framework using the message queue objects; and (c) issuing system service requests to he database system from an application program and retrieving system information from the database system to the application program through the objects framework using the system services objects.

12. The method of claim 11, wherein the modeling step (a) further comprises the step of modeling system services requests in the database system using the system services objects.

13. The method of claim 11, wherein the system services objects include one or more functions that allow the application program to invoke one or more system services of the database system.

14. The method of claim 11, when the system services objects include one or more functions that allow the application program to retrieve system information from the database system.

15. The method of claim 11, wherein the system services objects include one or more functions selected from a group comprising:

a function for performing checkpoints to commit database changes and establish a restart point, a function for performing checkpoints to commit database changes, establish a restart point, and save program areas, a function for checking deadlock occurrences and data availability, a function for retrieving system information, a function for retrieving a system ID, a function for retrieving a release level indicator, a function for retrieving control region type, a function for retrieving a region identifier, a function for retrieving a name of an application program, a function for retrieving a name of a program status block, a function for retrieving a transaction name, a function for retrieving a userid, a function for retrieving a group name, a function for retrieving a Status Group Indicator, a function for verifying an existence of a program control block, a function for retrieving a program status block name for an application program, a function for retrieving a message, a function for issuing a command and retrieving a command response, a function for retrieving subsequent command responses, a function for writing information to a system log, a function for abnormally terminating an application program and backing out any changes to a database, a function for rolling back changes to a database, a function for backing out to a previously-set processing point, a function for setting an intermediate back-out point or canceling all existing back-out points, a function for setting an intermediate back-out point if unsupported program control blocks exist or an external subsystem is used, a function for collecting diagnostic information, a function for obtaining database statistics for performance monitoring, a function for releasing resources that have been locked for an application program, a function for terminating a program status block in an application program, and a function for restarting an application program.

* * * * *

UNITED STATES PATENT AND TRADEMARK OFFICE
CERTIFICATE OF CORRECTION

PATENT NO. : 6,539,397 B1
DATED : March 25, 2003
INVENTOR(S) : Bach Dinh Doan, Shyh-Mei Fang Ho and John Richard Shelton It is certified that error appears in the above-identified patent and that said Letters Patent is hereby corrected as shown below:

Column 15,
Line 15, "pain" should read -- point --
Line 17, "dam" should read -- data --

Column 16,
Line 10, "ad" should read -- and --
Line 13, "wit" should read -- with --
Line 29, "tie" should read -- the --
Line 51, "me" should read -- name --

Column 17,
Line 37, "A" should read -- a --
Line 38, "toot" should read -- root --
Line 45, "he" should read -- the --

Signed and Sealed this

Ninth Day of September, 2003

JAMES E. ROGAN
*Director of the United States Patent and Trademark Office*